United States Patent
Lee et al.

(10) Patent No.: US 7,269,104 B2
(45) Date of Patent: *Sep. 11, 2007

(54) OPTICAL DISC AND METHOD FOR RECORDING DATA ON AND/OR REPRODUCING DATA FROM THE SAME

(75) Inventors: Kyung-geun Lee, Gyeonggi-do (KR); In-sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

This patent is subject to a terminal disclaimer.

(21) Appl. No.: 10/440,242

(22) Filed: May 19, 2003

(65) Prior Publication Data

US 2003/0214889 A1 Nov. 20, 2003

(30) Foreign Application Priority Data

May 20, 2002 (KR) .................. 10-2002-0027949

(51) Int. Cl.
*G11B 11/00* (2006.01)

(52) U.S. Cl. .............................. 369/47.14; 369/53.15; 369/59.25

(58) Field of Classification Search ............. 369/53.15; G11B 7/00
See application file for complete search history.

(56) References Cited

U.S. PATENT DOCUMENTS

| | | | |
|---|---|---|---|
| 6,034,932 A | | 3/2000 | Ishida et al. |
| 6,078,559 A | * | 6/2000 | Takemura et al. ....... 369/275.3 |
| 6,115,340 A | | 9/2000 | Van Den Enden et al. |
| 6,317,397 B1 | * | 11/2001 | Deguchi et al. ......... 369/47.19 |
| 6,373,800 B1 | | 4/2002 | Takahashi et al. |
| 6,606,285 B1 | | 8/2003 | Ijtsma et al. |
| 6,785,206 B1 | | 8/2004 | Lee et al. |
| 6,999,390 B2 | | 2/2006 | Lee et al. |
| 2003/0214890 A1 | | 11/2003 | Lee et al. |

FOREIGN PATENT DOCUMENTS

| | | |
|---|---|---|
| CN | 1273419 A | 11/2000 |
| CN | 1338102 A | 2/2002 |
| EP | 0 630 022 | 5/1994 |
| EP | 1 052 639 | 11/2000 |
| EP | 1 258 884 | 11/2002 |
| JP | 62-154371 | 7/1987 |
| JP | 09-282668 | 10/1997 |
| JP | 2000-076657 | 3/2000 |

(Continued)

*Primary Examiner*—William Korzuch
*Assistant Examiner*—Joseph Haley
(74) *Attorney, Agent, or Firm*—Stein, McEwen & Bui, LLP (57) ABSTRACT

An optical disc on which data is recorded and/or from which the data is reproduced, includes a recording area where the data is recorded in at least one physical cluster, a defective area, where a defect that prevents a recording and/or reproduction of data is present, provided in the recording area, and a recording end area where information indicating an end of recording is recorded before the defective area. A method of recording data on and/or reproducing the data from a high density optical disc having a defective area, includes recording the data in a predetermined recording area having the defective area, and recording end data indicating an end of the recording before the defective area.

68 Claims, 10 Drawing Sheets

FOREIGN PATENT DOCUMENTS

| | | |
|---|---|---|
| JP | 2000-090585 | 3/2000 |
| JP | 2000-149276 | 5/2000 |
| JP | 2001-357625 | 12/2001 |
| JP | 2002-050110 | 2/2002 |
| JP | 2005-524921 | 8/2005 |
| JP | 2005-526345 | 9/2005 |
| KR | 2000-75374 | 12/2000 |
| WO | 01/22416 | 3/2001 |
| WO | WO 03/094156 | 11/2003 |
| WO | WO 03/098609 | 11/2003 |

* cited by examiner

OPTICAL DISC AND METHOD FOR RECORDING DATA ON AND/OR REPRODUCING DATA FROM THE SAME

CROSS-REFERENCE TO RELATED APPLICATIONS

This application claims the benefit of Korean Patent Application No. 2002-27949 filed on May 20, 2002 in the Korean Intellectual Property Office, the disclosure of which is incorporated herein by reference.

BACKGROUND OF THE INVENTION

1. Field of the Invention

The present invention relates to a high density optical disc and a method of recording data on and/or reproducing data from the high density optical disc, and more particularly, to a high density optical disc in which, where data is continuously recorded in an area including a defective area, information indicating an end of a recording is recorded in a preceding area that precedes the defective area and a linking is performed in a subsequent area that is subsequent to the defective area, and a method of recording data on and/or reproducing data from the high density optical disc.

2. Description of the Related Art

Generally, optical discs are widely used as information recording media for an optical pickup apparatus which records and/or reproduces information in a non-contact manner. The optical discs include compact discs (CDs), digital versatile discs (DVDs), etc., which are classified according to the information recording capacity. For example, there are 650 MB CDRs, CD-RWs, 4.7 GB DVD+RWs, etc., as optical discs capable of being recorded on, erased, and reproduced from. Furthermore, an HD-DVD having a 23 GB recording capacity has been developed.

Figure 1:
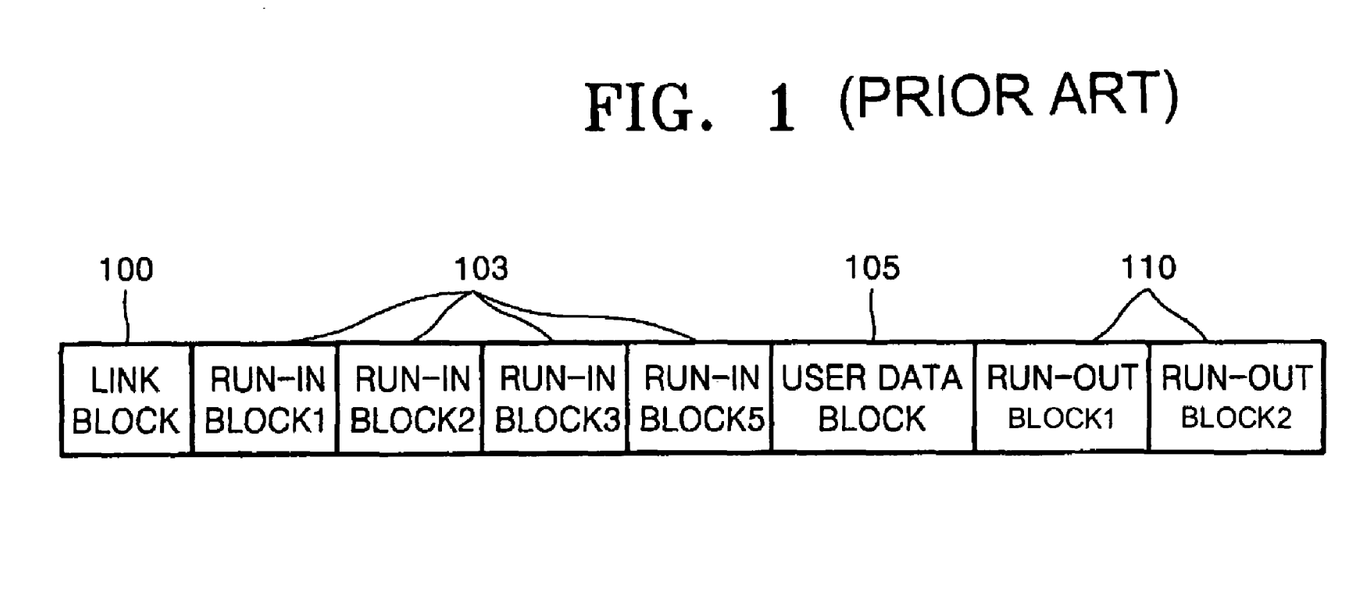
FIG. 1 is a block diagram illustrating the structure of a basic recording unit applied to a conventional CD-RW.

In the case of a conventional CD-RW capable of a repetitive recording, a basic recording unit in which a predetermined amount of data can be recorded is referred to as a packet and the known structure of the packet is shown in FIG. 1. A plurality of run-in blocks 103 and run-out blocks 105 are arranged before and after a user data block 105, where user data is recorded. Also, a link block 100 is provided at a leading portion of a basic recording unit to enable a continuous recording. However, where the user data block 105 includes a defective area where a recording is not possible, since data cannot be recorded in the defective area, the recording must be terminated before the defective area. However, where the defective area is found, there is no definition made with respect to a recording and/or reproduction method or the structure of an optical disc. Thus, it is likely that the defective area is processed differently according to the manufacturer of the disc or the recording and/or reproduction apparatus. Accordingly, a compatibility problem of a disc drive may occur.

Korean Patent Publication No. 2000-75374 filed by the present applicant discloses a defective area processing method and a recording medium in which a linking scheme of a predetermined rule is applied just behind a defective area with respect to a DVD-RW.

However, in the case of a high density optical disc having a capacity of 20 GB or more, to be introduced in the near future, where a defective area is found, there is no definition of a method and a structure of a disc to process the defective area. Thus, the above-described compatibility problem of a disc drive arises, and accordingly, a recording and/or reproduction becomes unstable with respect to the disc. Therefore, for the case in which a defective area is found in a high density optical disc, a definition of a recording and/or reproduction method and a structure of a disc corresponding thereto is needed.

SUMMARY OF THE INVENTION

Accordingly, it is an aspect of the present invention to provide an optical disc in which, where a defective area is found during a verification of the disc or a recording and/or reproduction of data, recording end data indicating that a recording is terminated is recorded just before the defective area, and a method of recording data on and/or reproducing data from the optical disc. Thus, since the compatibility of a disc drive is ensured, the recording and/or reproduction performance of a high density optical disc is improved.

Another aspect of the present invention is to provide an optical disc and a method of recording data on and/or reproducing data from the optical disc in which recording and/or reproduction operations are performed smoothly and continuously by performing a linking subsequent to a defective area.

Additional objects and advantages of the invention will be set forth in part in the description which follows and, in part, will be obvious from the description, or may be learned by practice of the invention.

To achieve the above and/or other aspects of the present invention, there is provided an optical disc on which data is recorded and/or from which the data is reproduced, comprising a recording area where the data is recorded, a defective area, included in the recording area, where a defect that prevents a recording and/or reproduction of data is present, and a recording end area, provided before the defective area, where information indicating an end of the recording is recorded.

The defective area may be found during a verification of the optical disc before the data is recorded or during the recording and/or reproduction of data.

The optical disc may further comprise a run-in and a run-out which are provided before and after a physical cluster, respectively, wherein the data is recorded in a unit of the physical cluster, and the run-in and the run-out are provided to accurately record the data.

A predetermined amount of data may be recorded in a basic recording unit of the optical disc, and an end portion of the basic recording unit may include a guard-3 where end data indicating the end of the recording is recorded.

The guard-3 may have a length of at least 300 channel bits and formed of a continuous pattern including at least 3T and 5T.

The recording may be performed with respect to the defective area by lowering a recording power of a light source for the recording, to a power that does not incur the recording. The recording power of the light source may be maintained as a reproduction power with respect to the defective area.

The recording area may comprise a recorded area in which the data is already recorded and a blank area in which the data is not recorded.

To achieve the above and/or other aspects of the present invention, there is provided another optical disc on which data is recorded and/or from which the data is reproduced, comprising a recording area where the data is recorded, a defective area, included in the recording area, where a defect that prevents a recording and/or reproduction of data is present, a recording end area, provided before the defective area, where information indicating an end of the recording is recorded, and a linkage which is set to occur subsequent to the defective area.

The data may be recorded in a unit of a physical cluster. The optical disc may further comprise a run-in and a run-out which are provided before and after the physical cluster, respectively. The run-in and the run-out may include a guard-1 and a guard-2, respectively, which protect user data.

To achieve the above and/or other aspects of the present invention, there is provided a method of recording data on and/or reproducing the data from an optical disc having a defective area, the method comprising recording the data in a predetermined recording area having the defective area, and recording information indicating an end of the recording before the defective area.

The method may further comprise processing a linkage to occur subsequent to the defective area.

The data may be recorded in units of physical clusters.

To achieve the above and/or other aspects of the present invention, there is provided another method of recording data on and/reproducing the data from an optical disc having a defective area, the method comprising recording the data in a predetermined recording area having the defective area, and processing a linkage to occur subsequent to the defective area.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2A:
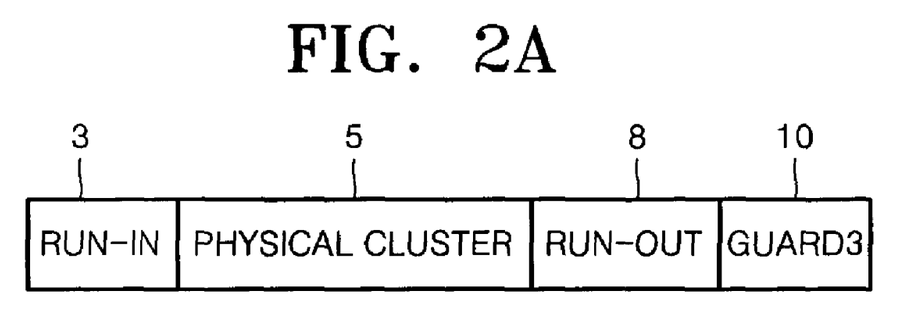
FIG. 2A is a block diagram illustrating a structure where data is recorded in a single physical cluster, according to the present invention.
Figure 2B:
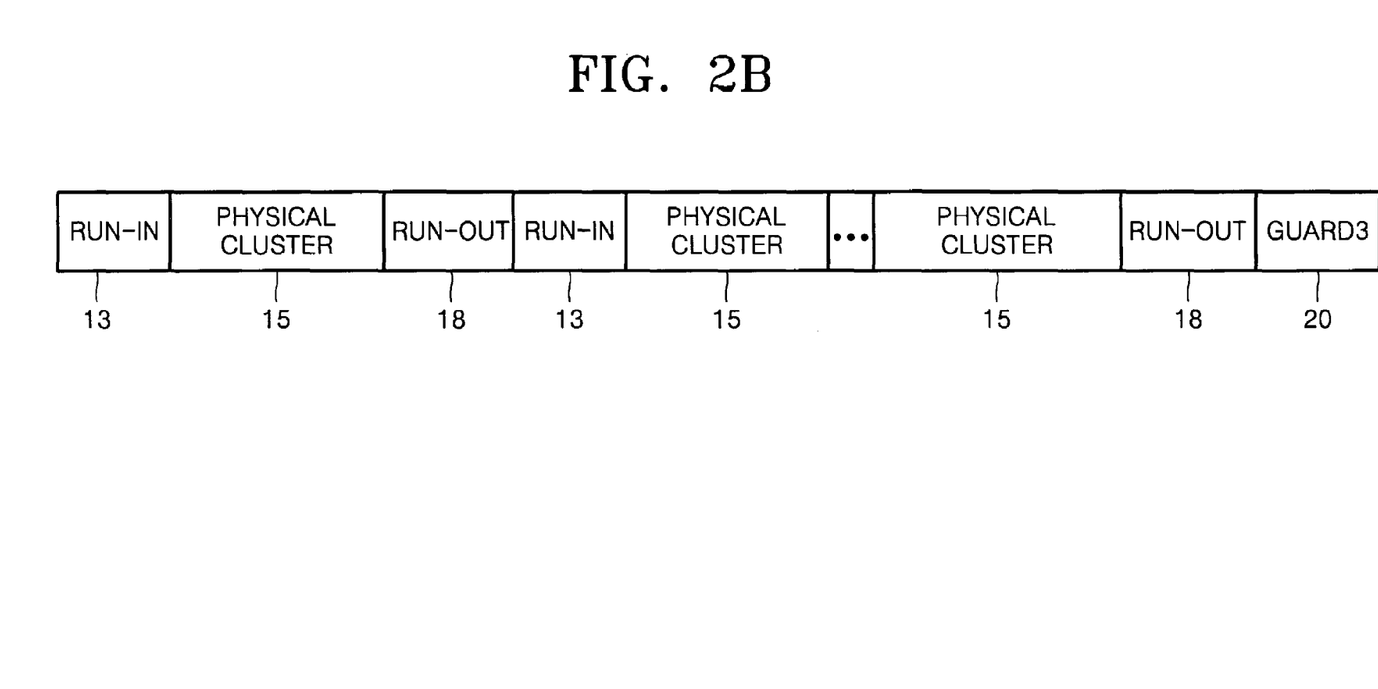
FIG. 2B is a block diagram illustrating a recording structure where data is continuously recorded in a plurality of physical clusters, according to the present invention.

FIG. 2A shows a case in which data is recorded in a single physical cluster 5 in a high density optical disc that records and/or reproduces the data. FIG. 2B shows a case in which data is continuously recorded in a plurality of physical clusters 15. Referring to FIGS. 2A and 2B, run-ins 3 and 13 and run-outs 8 and 18 are disposed before and after the physical clusters 5 and 15, respectively. The run-ins 3 and 13 and the run-outs 8 and 18 allow an accurately recording of data in the physical clusters 5 and 15 during a recording and/or reproducing of data. That is, where data is recorded in the run-ins 3 and 13 or the run-outs 8 and 18, which is not a correct position for the data, an error correction is processed so as to allow the data to be smoothly recorded and/or reproduced.

Also, a guard-3 10 or 20, where information indicating an end of a recording is stored, is provided at an end portion where the recording ends. That is, a data recording and/or reproduction of a basic recording unit, where a predetermined amount of data is recorded, is completed by the guard-3. Here, although a physical cluster is explained as a minimum recording unit where user data is recorded, other units including a sector, an ECC block, or a frame may be a minimum recording unit.

Figure 3A:
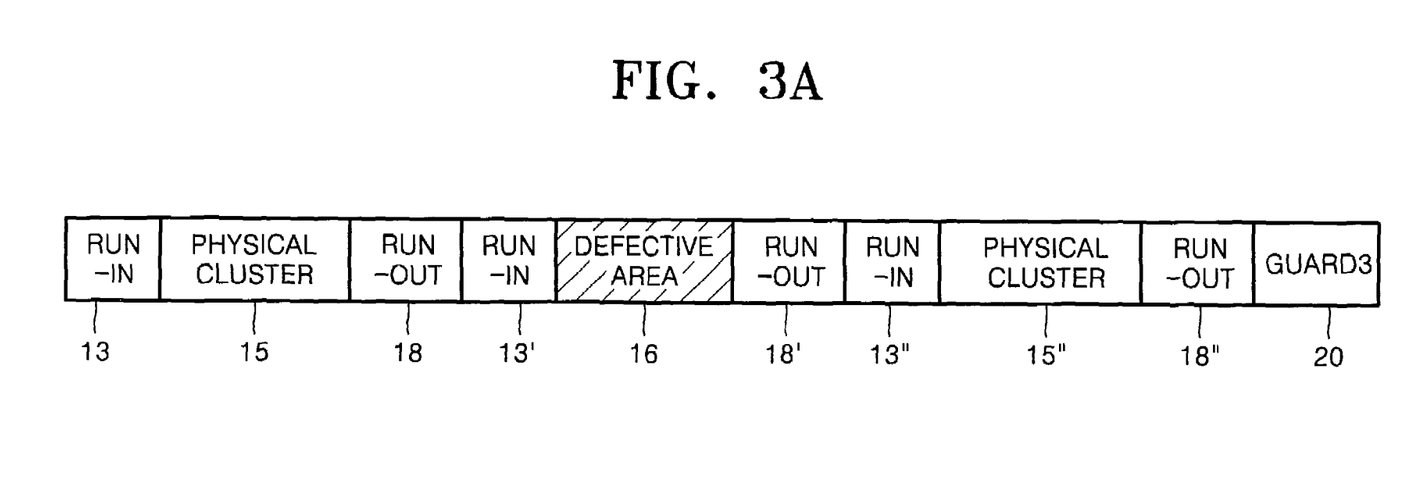
FIG. 3A is a block diagram illustrating a case in which a defective area is detected, where data is continuously recorded in a plurality of physical clusters, in an optical disc according to an embodiment of the present invention.

FIG. 3A shows an optical disc according to an embodiment of the present invention. Where a recording and/or reproduction is continuously performed with respect to a basic recording unit having a predetermined capacity, in which user data is recorded, and a defective area 16 where data cannot be recorded and/or reproduced is found, an address corresponding to the defective area 16 is stored in a defect list area. The defective area 16 can also be found during a verification of the optical disc before the data is recorded, in addition to during the recording and/or reproduction of data. Where the defective area 16 is found during the verification of the optical disc, meaningless data that cannot be reproduced is recorded and the defective area 16 is detected by this recording.

Figure 3B:
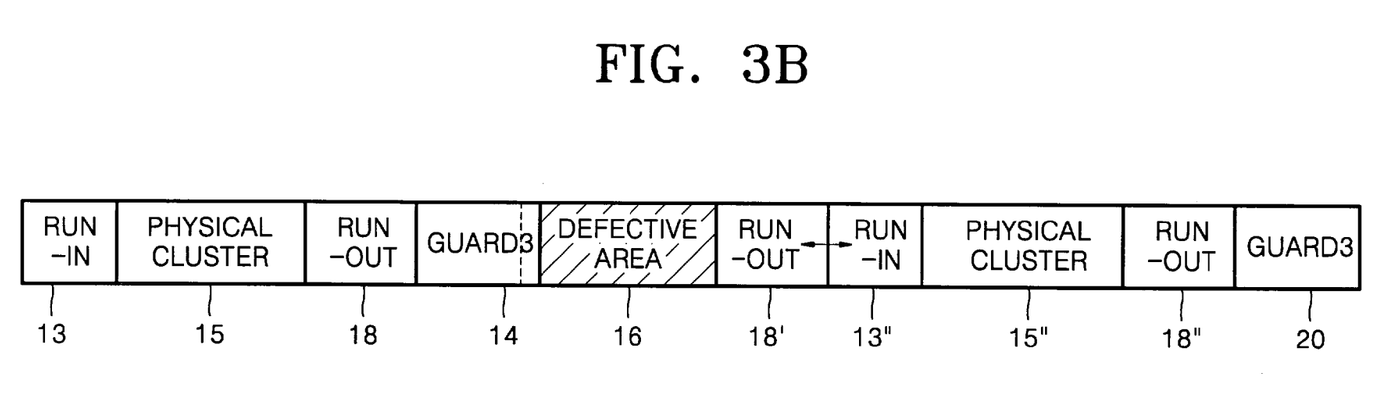
FIG. 3B is a block diagram illustrating an optical disc having a defective area, to explain a method of recording and/or reproducing data by processing the defective area of the optical disc, according to the present invention.
Figure 3C:
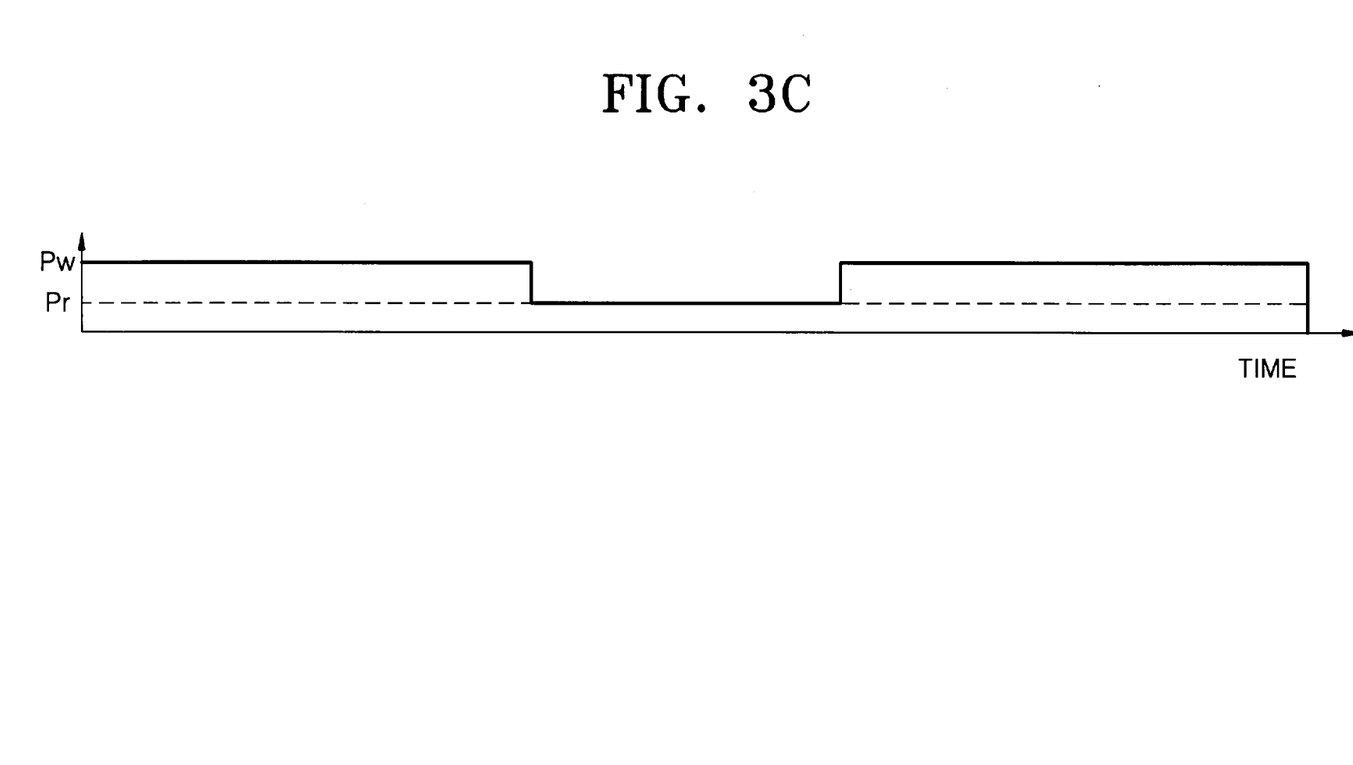
FIG. 3C is a view illustrating the power of a light source where recording and/or reproduction operations are performed with respect to an optical disc according to the present invention.

As shown in FIG. 3B, where a recording is performed with respect to a predetermined recording area including the defective area 16, since the recording cannot be performed in the defective area 16, a recording end area 14, where data indicating that the recording is terminated, is provided just before the defective area 16. The recording end area 14 can be configured identically to the guard-3 20. That is, the recording end area 14 can be configured to have the same length and pattern as the guard-3 20. For example, where the guard-3 20 has a length of at least 300 channel bits and a continuous pattern including at least 3T and 5T, the recording end area 14 may be configured to have the same length and pattern as the guard-3 20. Here, 3T and 5T are units of a length of a mark recorded on a disc.

Where data is recorded on an optical disc having the above structure, as shown in FIG. 3C, a recording is performed by maintaining the power of a light source (not shown) as a recording power Pw. Starting from a rear portion of the recording end area 14, before the defective area 16 begins, the power of the light source is controlled to be lower than the recording power Pw so as to prevent the recording. The power of the light source can be reduced to a reproduction power Pr. Here, the power of the light source is, for example, lowered before the recording end area 14 ends. As shown in FIG. 3B, the power is controlled to be the reproduction power Pr from a position indicated by a dotted line in the recording end area 14.

Figure 4A:
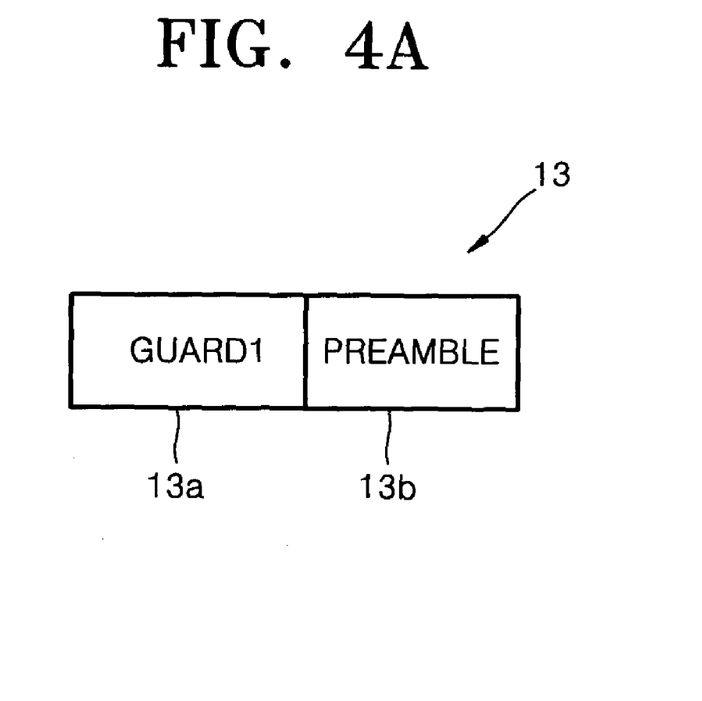
FIGS. 4A and 4B are block diagrams illustrating the structure of a run-in and a run-out, respectively, of an optical disc according to the present invention.
Figure 4B:
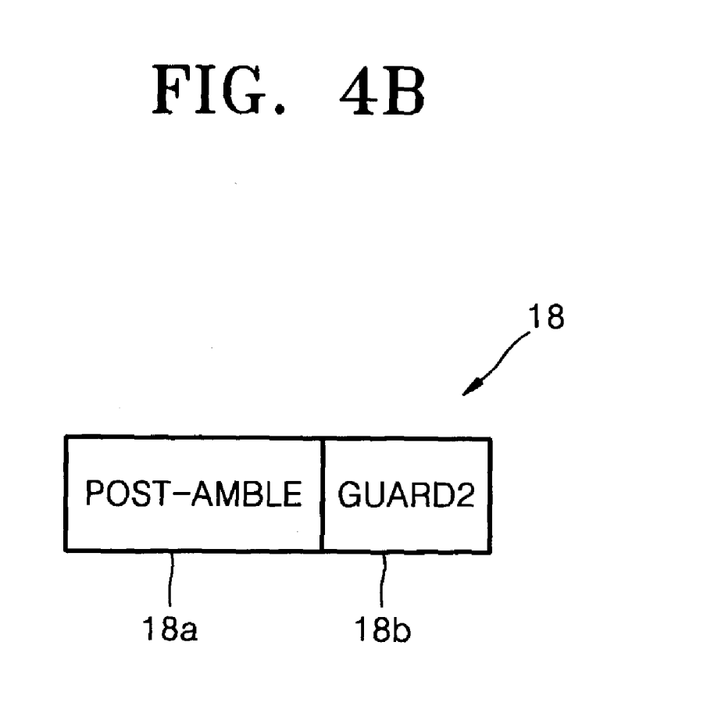

As shown in FIG. 4A, the run-in 13 includes, for example, a guard-1 13a having a predetermined pattern to overcome an overwriting due to a mismatch or change of a data recording start point, and a preamble 13b to perform a signal processing, for example, a locking or synchronizing. As shown in FIG. 4B, the run-out 18 includes, for example, a post-amble 18a to perform a signal processing and a guard-2 18b having a predetermined pattern to remove an overwriting due to a change of the data recording start point. As a result, the guard-1 13a and guard-2 18b serve as a buffer to protect user data. Here, the guard-2 18b and guard-3 20 can be configured to have the same lengths and patterns. For example, the guard-2 18b and guard-3 20 may have lengths of at least 300 channel bits and may be formed by continuous patterns including at least 3T and 5T.

A linkage may be generated subsequent to the defective area 16 so as to resume a recording from a physical cluster subsequent to the defective area 16. Thus, the power of the light source is raised back to the recording power Pw from a rear portion of a run-out 18' subsequent to the defective area 16 and a data recording begins again. For example, referring back to FIG. 3B, an arrow between the run-out 18' and the run-in 13" after the defective area 16 indicates that the linkage is generated.

A method of recording data on and/or reproducing data from an optical disc according to the present invention will now be described.

Referring to FIGS. 3A through 3C, where the defective area 16, in which no data can be recorded, is found during a verification of a disc or during a recording of data on or reproduction of data from the disc, data indicating that the recording ends is recorded in the run-in area 13' disposed before the defective area 16. Thus, the recording is not performed in the defective area 16 due to the recording end data. Here, the power of the light source in the defective area 16 is controlled to be lower than the recording power Pw, for example, the reproduction power Pr, so as not to record data.

Thereafter, a linkage is generated so as to record data in an area subsequent to the defective area 16. That is, the run-out 18' and the run-in-13" subsequent to the defective area 16 are linked.

Figure 5:
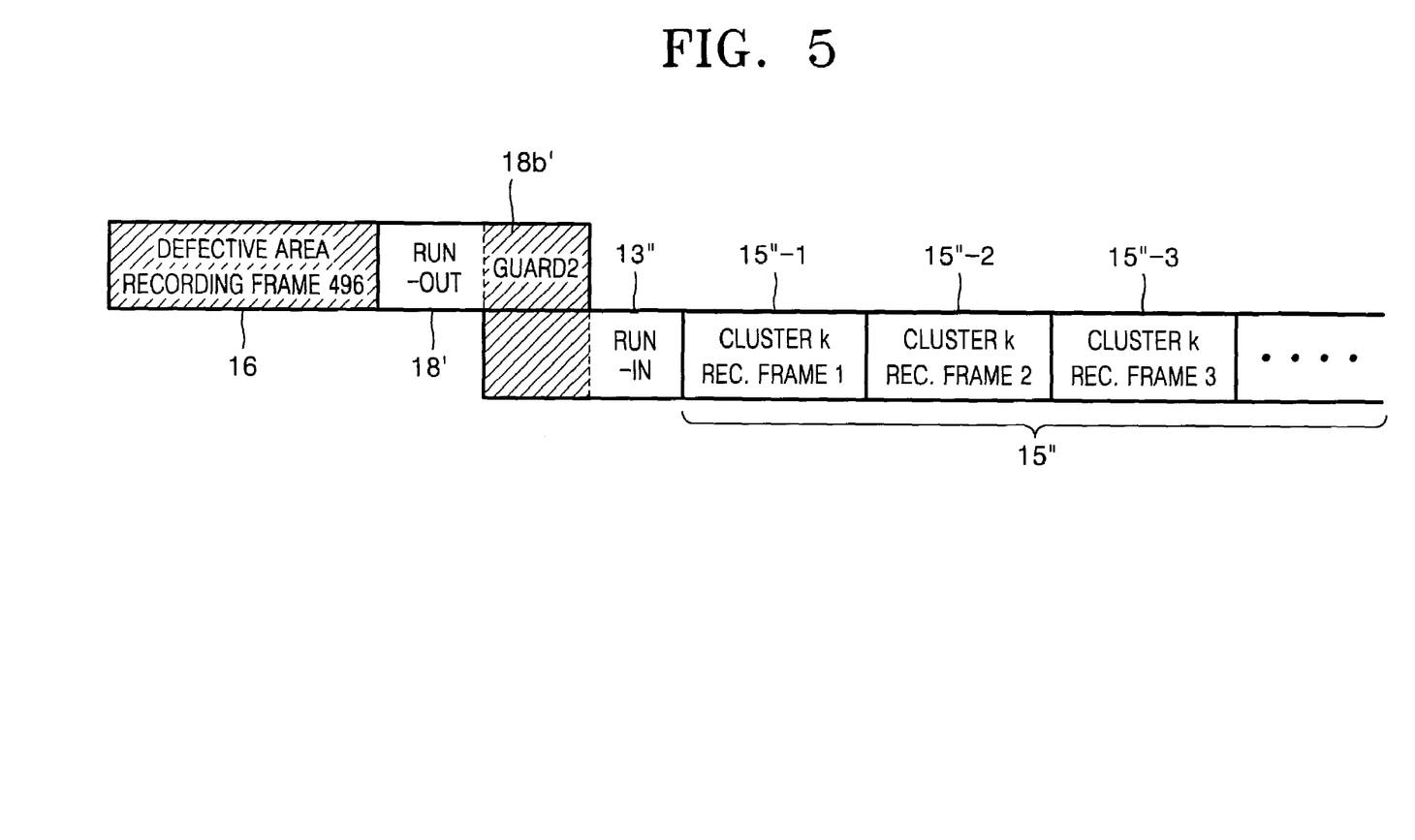
FIG. 5 is a block diagram illustrating that a linkage is generated subsequent to a defective area according to a method of recording data on and/or reproducing the data from an optical disc according to the present invention.

FIG. 5 shows that the run-out 18' and the run-in-13" subsequent to the defective area 16 are linked. Where the recording resumes after the defective area 16, data can be recorded overlapping a part of the run-out 18' and a part of the run-in 13" subsequent thereto, not in a desired position for the recording. In this case, the linking is performed by correcting an error corresponding to a portion where the recording overlaps. Here, the error correction is made in preparation for a case in which the recording does not resume at an accurate recording start point, where a recording ends before the defective area 16 and resumes after the defective area 16.

Where the guard-2 18b and the guard-3 20 present in the run-out 18' have the same configuration, that is, the same length and pattern, it may be advantageous to use the same linking scheme suggested for the guard-3 20. As a result, recording and/or reproduction operations are smoothly performed after the defective area 16. Recording and/or reproduction are continuously performed up to a physical cluster 15" subsequent to the run-in 13". Where another defective area is found during the recording and/or reproduction, a recording end area is defined just before the defective area in the same manner as described above, and a linkage is generated so as to resume the recording in an area subsequent to the defective area. The physical cluster 15" is formed of, for example, 496 recording frames (Rec.Frame) (15"-1, 15"-2, . . . ). In FIG. 5, these recording frames are illustrated after the run-in 13". Here, cluster k denotes the kth physical cluster.

Referring back to FIGS. 3A-3C, a recording is performed as the power of the light source is maintained at the recording power Pw in the run-in 13" subsequent to the defective area 16. The guard-3 20 indicating the end of recording is recorded at the end of a basic recording unit where a predetermined amount of data can be recorded. Here, the recording end data, that is, the guard-2, recorded before the defective area 16, is configured to be the same as the guard-3 20. For example, the guard-3s 14 and 20 may have a length of at least 300 channel bits and are configured as a continuous pattern including at least 3T and 5T.

An optical disc and a method of recording data on and/or reproducing the data from an optical disc according to another embodiment of the present invention will now be described with reference to FIGS. 6A and 6B.

Figure 6A:
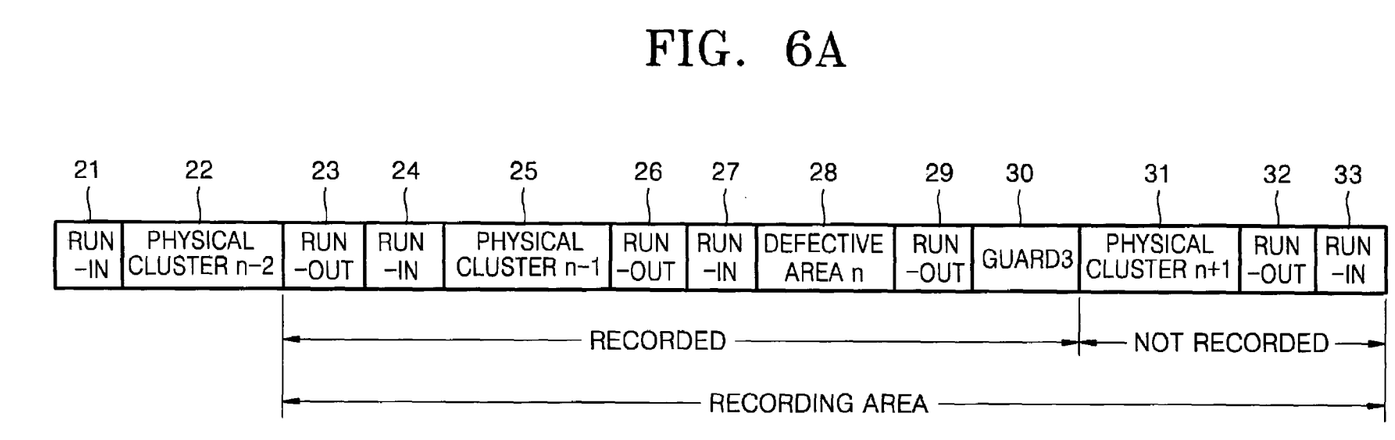
FIGS. 6A and 6B are block diagrams illustrating an optical disc having a defective area according to another embodiment of the present invention and a method of recording and/or reproduction by processing the defective area of the optical disc.

FIG. 6A shows a state prior to a recording, which is performed according to a method of recording data on and/or reproducing the data from an optical disc, according to another embodiment of the present invention. Here, a recording has been performed from an (n−2)th physical cluster 22 to an nth block 28 and a blank area in which no data is recorded is present starting from an (n+1)th block 31. The (n−2)th through (n+1)th blocks 22, 25, 28, and 31 have run-ins 21, 24, and 27 and run-outs 23, 26, 29, and 32, respectively, and a defective area is found in the nth block 28. Since the recording is terminated in the nth block 28, a guard-3 30 indicating the end of recording is recorded in a run-in area disposed after the nth block 28. Here, the recording is performed from the (n−2)th block 22 to the (n+1)th block 31, a part of a recording area is already recorded on and the remaining part is not recorded on. In this case, a method of recording and/or reproducing data with respect to the optical disc, according to the present invention, can be applied.

Figure 6B:
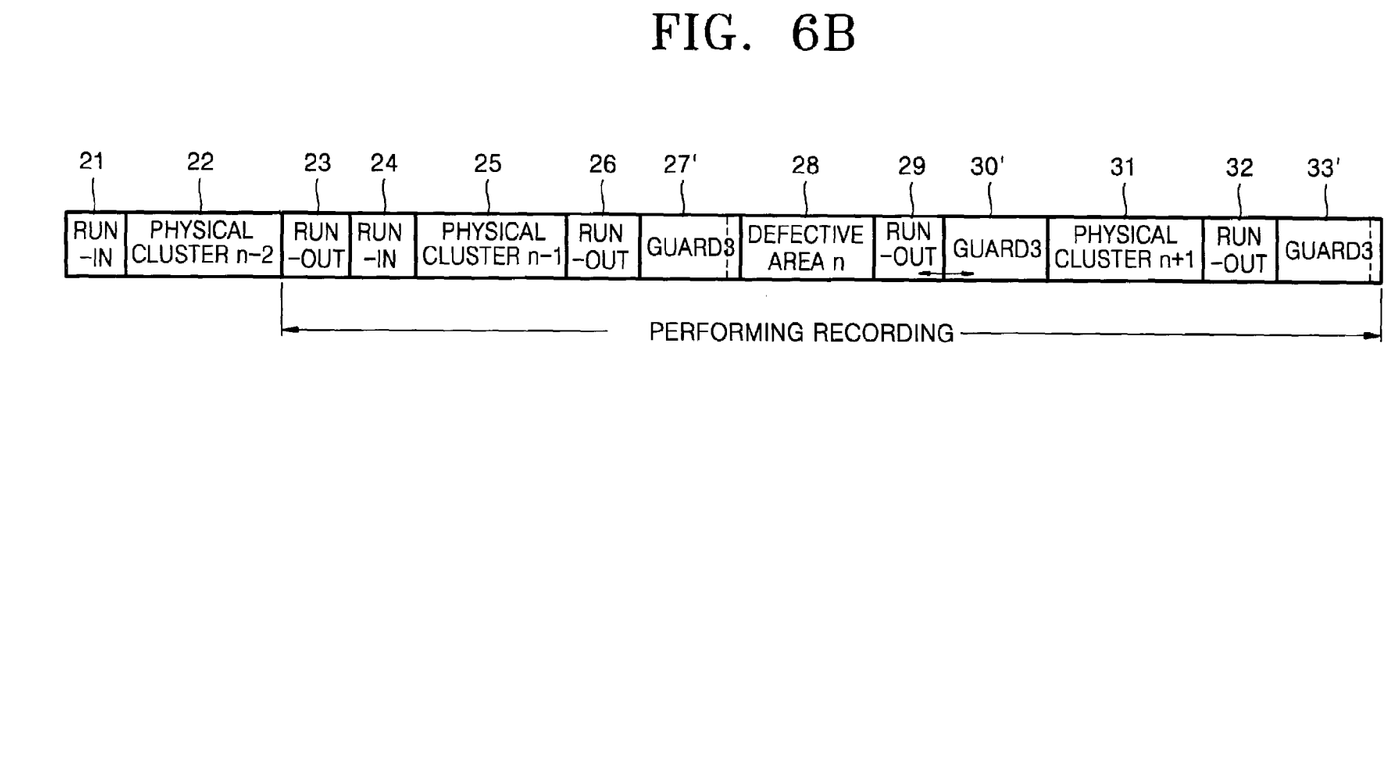

FIG. 6B shows a state in which a recording has been performed according to a method of recording data on and/or reproducing the data from an optical disc according to the present invention.

A recording begins from the (n−2)th block 22 and ends before the nth block 28, which is a defective area. Thus, a guard-3 27' indicating the end of recording is recorded before the defective area 28. The run-out 29 and the run-in 30' subsequent to the defective area 28 are linked. A guard-3 33' indicating the end of recording is recorded in the run-in subsequent to the (n+1)th block 31 where the recording ends.

Where the recording is performed in an area including a defective area found during a continuous data recording and/or reproduction with respect to a high density optical disc, or during a verification of a blank disc, data indicating the end of recording is recorded just before the defective area and a linkage is defined to occur subsequent to the defective area. Thus, a more stable and reliable data recording and/or reproduction is possible.

In an optical disc and a method of recording data on and/or reproducing the data from the optical disc according to the present invention, where a defective area is present, since data indicating the end of recording is recorded such that a recording ends before the defective area, recording is not performed in the defective area. Furthermore, since a linkage is processed to occur in an area subsequent to the defective area, the data is stably recorded and/or reproduced. In the high density optical disc where the data is continuously recorded and/or reproduced, by proposing a standard to process the defective area, the compatibility of a disc drive is ensured, and accordingly, reliability in recording and/or reproduction with respect to the high density optical disc is improved.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc on which data is recorded and/or from which the data is reproduced, comprising:
    a recording area where the data is recorded;
    a defective area, included in the recording area, where a defect that prevents a recording and/or reproduction of data is present; and
    a recording end area, provided immediately before the defective area, that includes information indicating to a recording and/or reproducing apparatus an end of recording so as to prevent the apparatus from writing data to the defective area, wherein
    a predetermined amount of data is recorded in a basic recording unit of the optical disc, and
    an end portion of the basic recording unit includes a guard-3 where end data indicating the end of the recording is recorded.

2. The optical disc as claimed in claim 1, wherein the defective area is found during a verification of the optical disc before the data is recorded or during the recording and/or reproduction of data.

3. An optical disc on which data is recorded and/or from which the data is reproduced, comprising:
    a recording area where the data is recorded in a unit of a physical cluster, a run-in and a run-out being provided before and after the physical cluster, respectively;
    a defective area, included in the recording area, where a defect that prevents a recording and/or reproduction of data is present; and
    a recording end area, provided immediately before the defective area and disposed after the run out of an adjacent physical cluster, that includes information indicating an end of recording so as to prevent the apparatus from writing data to the defective area, wherein:
        the run-in and the run-out are provided to accurately record the data in the physical clusters,
        a predetermined amount of data is recorded in a basic recording unit of the optical disc, and
        an end portion of the basic recording unit includes a guard-3 where end data indicating the end of the recording is recorded.

4. The optical disc as claimed in claim 1, wherein the recording end area is configured to be the same as the guard-3.

5. The optical disc as claimed in claim 4, wherein the guard 3 has a length of at least 300 channel bits and is formed of a continuous pattern including at least 3T and 5T.

6. The optical disc as claimed in claim 1, wherein the recording is performed with respect to the defective area by lowering a recording power of a light source for the recording, to a power that does not incur the recording.

7. The optical disc as claimed in claim 6, wherein the recording power of the light source is maintained as a reproduction power with respect to the defective area.

8. The optical disc as claimed in claim 1, wherein the recording area comprises a recorded area in which the data is already recorded and a blank area in which the data is not recorded.

9. An optical disc on which data is recorded and/or from which the data is reproduced, comprising:
    a recording area where the data is recorded;
    a defective area, included in the recording area, where a defect that prevents a recording and/or reproduction of data is present;
    a recording end area, provided immediately before the defective area, that includes information indicating to a recording and/or reproducing apparatus an end of recording; and
    a linkage provided subsequent to the defective area which is used by the recording and/or reproducing apparatus to record new data after the defective area in another area of the recording area, wherein
    a predetermined amount of data is recorded in a basic recording unit of the optical disc, and
    an end portion of the basic recording unit includes a guard-3 where end data indicating the end of the recording is recorded.

10. The optical disc as claimed in claim 9, wherein the defective area is found during a verification of the optical disc before the data is recorded or during the recording and/or reproduction of data.

11. An optical disc on which data is recorded and/or from which the data is reproduced, comprising:
    a recording area where the data is recorded in a unit of a physical cluster, a run-in and a run-out being provided before and after the physical cluster, respectively;
    a defective area, included in the recording area, where a defect that prevents a recording and/or reproduction of data is present;
    a recording end area, provided immediately before the defective area and disposed after the run-out of an adjacent physical cluster, includes information indicating to a recording and/or reproducing apparatus an end of recording so as to prevent the apparatus from writing data to the defective area; and
    a linkage provided subsequent to the defective area which is used by the recording and/or reproducing apparatus to record new data after the defective area in another area of the recording area, wherein
    the run-in and the run-out are provided to accurately record the data in the physical cluster,
    a predetermined amount of data is recorded in a basic recording unit of the optical disc, and
    an end portion of the basic recording unit includes a guard-3 where end data indicating the end of the recording is recorded.

12. The optical disc as claimed in claim 9, wherein the recording end area is configured to be the same as the guard-3.

13. The optical disc as claimed in claim 12, wherein the guard-3 has a length of at least 300 channel bits and is formed of a continuous pattern including at least 3T and 5T.

14. The optical disc as claimed in claim 9, wherein the recording is performed with respect to the defective area by lowering a recording power of a light source for the recording, to a power that does not incur the recording.

15. The optical disc as claimed in claim 14, wherein the recording power of the light source is maintained as a reproduction power with respect to the defective area.

16. The optical disc as claimed in claim 11, wherein the run-in and the run-out include a guard-1 and a guard-2, respectively, which protect user data.

17. The optical disc as claimed in claim 16, wherein:
an end portion of the physical cluster includes a guard-3 where end data indicating an end block of the recorded data is recorded, and
the guard-2 has the same length and pattern as the guard-3.

18. The optical disc as claimed in claim 17, wherein the guard-2 has a length of at least 300 channel bits and is formed of a continuous pattern including at least 3T and 5T.

19. The optical disc as claimed in claim 9, wherein the recording area comprises a recorded area in which the data is already recorded and a blank area in which the data is not recorded.

20. A method of recording data on and/or reproducing the data from an optical disc having a defective area, the method comprising:
prior to or during recording the data in a predetermined recording area having the defective area of the optical disc, processing information indicating an end of recording and which is recorded in a recording end area, provided immediately before the defective area, so as to not record the data in the defective areas;
recording a predetermined amount of data in a basic recording unit; and
providing a guard-3 to record end data indicating the end of the recording at an end portion of the basic recording unit.

21. The method as claimed in claim 20, further comprising processing a linkage to occur subsequent to the defective area.

22. The method as claimed in claim 20, further comprising detecting the defective area during a verification of the optical disc before the data is recorded or during the recording of the data, and recording the information indicating the end of recording in the recording end area.

23. The method as claimed in claim 20, wherein the recording of the data comprises recording the data in units of physical clusters.

24. The method as claimed in claim 22, wherein the recording of the data comprises recording the data in units of physical clusters.

25. The method as claimed in claim 22, wherein the recording of the data comprises lowering a recording power of a light source for the recording, to a power that does not incur the recording with respect to the defective area.

26. The method as claimed in claim 25, wherein the lowering of the recording power of the light source comprises maintaining the recording power as a reproduction power with respect to the defective area.

27. A method of recording data on and/or reproducing the data from an optical disc having a defective area, the method comprising:
recording the data in a predetermined recording area having the defective area of the optical disc; and
detecting information indicating an end of recording and which is recorded in a recording end area immediately before the defective area so as to not record the data in the defective area,
wherein the recording of the data comprises:
recording a predetermined amount of the data in a unit of a physical cluster as a basic recording unit; and
providing a run-in and a run-out before and after the physical cluster to accurately record the data in the physical cluster such that the recording end area with the detected information is disposed after the run-out of an adjacent physical cluster and before the defective area;
providing a guard-3 to record end data indicating the end of the recording at an end portion of the basic recording unit.

28. The method as claimed in claim 20, wherein the recording of the information indicating the end of recording comprises recording the information having the same length and pattern as that of the guard-3.

29. The method as claimed in claim 27, wherein the providing of the run-in and the run out comprises providing the run-in and the run-out having a guard-1 and a guard-2, respectively, to protect user data.

30. The method as claimed in claim 29, wherein the recording of the information indicating the end of recording includes providing a guard-3, and where end data indicating an end block of recorded data is recorded, the guard-2 having the same length and pattern as the guard-3 is provided at an end portion of the physical cluster.

31. The method as claimed in claim 28, wherein the providing of the guard-3 comprises providing the guard-3 having a length of at least 300 channel bits and a continuous pattern including at least 3T and 5T.

32. The method as claimed in claim 20, wherein the predetermined recording area includes a recorded area in which the data is already recorded and a blank area in which the data is not recorded.

33. A method of recording data on and/or reproducing the data from an optical disc having a predetermined recording area with a defective area, the method comprising:
processing information indicating an end of recording to occur in a recording end area immediately before the defective area so as to not record the data in the defective area; and
processing a linkage to occur subsequent to the defective area such that the defective area is between the linkage and the recording end area including the information indicating the end of recording;
recording a predetermined amount of data in a basic recording unit; and
providing a guard-3 to record end data indicating the end of the recording at an end portion of the basic recording unit.

34. The method as claimed in claim 33, further comprising detecting the defective area during a verification of the optical disc before the data is recorded or during the recording and/or reproduction of data, and the processing the information and the linkage comprises recording the information indicating the end of recording and the linkage such that the defective area is between the linkage and the recording end area including the information indicating the end of recording.

35. The method as claimed in claim 33, further comprising recording the data in units of physical clusters.

36. The method as claimed in claim 33, wherein the predetermined recording area includes a recorded area in which the data is already recorded and a blank area after the linkage in which the data is not recorded, and the method further comprises recording new data in the blank area using the linkage.

37. The method as claimed in claim 35, wherein the predetermined recording area includes a recorded area in which the data is already recorded and a blank area after the linkage in which the data is not recorded, and the method further comprises recording new data in the blank area using the linkage.

38. The method as claimed in claim 37, wherein the recording of the data comprises:
   recording the data in the unit of the a physical cluster;
   providing an end portion of the physical cluster having a guard-3 to indicate an end block of the recorded data; and
   providing a run-out including a guard-2 to protect the data, the guard-2 having the same length and pattern as the guard-3, subsequent to the physical cluster.

39. The method as claimed in claim 38, wherein the providing of the end portion includes providing the end portion including the guard-3 having a length of at least 300 channel bits and a continuous pattern including at least 3T and 5T.

40. The optical disc as claimed in claim 2, further comprising a run-in and a run-out which are provided before and after a physical cluster, respectively, wherein:
   the data is recorded in a unit of the physical cluster,
   the recording end area is between the defective area and the run-out of an adjacent physical cluster, and
   the run-in and the run-out are provided to accurately record the data in the physical cluster.

41. The optical disc as claimed in claim 2, wherein the recording is performed with respect to the defective area by lowering a recording power of a light source for the recording, to a power that does not incur the recording.

42. The optical disc as claimed in claim 4, wherein the recording is performed with respect to the defective area by lowering a recording power of a light source for the recording, to a power that does not incur the recording.

43. The optical disc as claimed in claim 5, wherein the recording is performed with respect to the defective area by lowering a recording power of a light source for the recording, to a power that does not incur the recording.

44. The optical disc as claimed in claim 2, wherein the recording area comprises a recorded area in which the data is already recorded and a blank area in which the data is not recorded.

45. The optical disc as claimed in claim 10, further comprising a run-in and a run-out which are provided before and after a physical cluster, respectively, wherein:
   the data is recorded in a unit of the physical cluster,
   the recording end area is disposed between the defective area and the run-out of an adjacent physical cluster, and
   the run-in and the run-out are provided to accurately record the data in the physical cluster.

46. The optical disc as claimed in claim 10, wherein the recording is performed with respect to the defective area by lowering a recording power of a light source for the recording, to a power that does not incur the recording.

47. The optical disc as claimed in claim 12, wherein the recording is performed with respect to the defective area by lowering a recording power of a light source for the recording, to a power that does not incur the recording.

48. The optical disc as claimed in claim 13, wherein the recording is performed with respect to the defective area by lowering a recording power of a light source for the recording, to a power that does not incur the recording.

49. The optical disc as claimed in claim 10, wherein the recording area comprises a recorded area in which the data is already recorded and a blank area in which the data is not recorded.

50. The optical disc as claimed in claim 12, wherein the recording area comprises a recorded area in which the data is already recorded and a blank area in which the data is not recorded.

51. The optical disc as claimed in claim 13, wherein the recording area comprises a recorded area in which the data is already recorded and a blank area in which the data is not recorded.

52. The method as claimed in claim 21, further comprising detecting the defective area during a verification of the optical disc before the data is recorded or during the recording and/or reproduction of data.

53. The method as claimed in claim 21, wherein the recording of the data comprises recording the data in units of physical clusters.

54. The method as claimed in claim 21, wherein the recording of the data comprises:
   recording the data in a unit of a physical cluster; and
   providing a run-in and a run-out before and after the physical cluster to accurately record the data in the physical cluster such that the recording end area with the information indicating the end of recording is between the run-out of an adjacent physical cluster and the defective area.

55. The method as claimed in claim 28, wherein the providing of the guard 3 comprises providing the guard-3 having a length of at least 300 channel bits and a continuous pattern including at least 3T and 5T.

56. The method as claimed in claim 30, wherein the providing of the guard 3 comprises providing the guard-3 having a length of at least 300 channel bits and a continuous pattern including at least 3T and 5T.

57. The method as claimed in claim 21, wherein the predetermined recording area includes a recorded area in which the data is already recorded and a blank area in which the data is not recorded.

58. The method as claimed in claim 24, wherein the predetermined recording area includes a recorded area in which the data is already recorded and a blank area in which the data is not recorded.

59. The method as claimed in claim 25, wherein the predetermined recording area includes a recorded area in which the data is already recorded and a blank area in which the data is not recorded.

60. The method as claimed in claim 26, wherein the predetermined recording area includes a recorded area in which the data is already recorded and a blank area in which the data is not recorded.

61. The method as claimed in claim 34, wherein the recording of the data comprises recording the data in units of physical clusters.

62. The method as claimed in claim 34, wherein the predetermined recording area includes a recorded area in which the data is already recorded and a blank area in which the data is not recorded.

63. The optical disc as claimed in claim 9, wherein the linkage is set so as to record the data in an area of the recording area subsequent to the defective area.

64. The optical disc as claimed in claim 9, wherein:
   the linkage allows a resumption of the recording from a physical cluster subsequent to the defective area, and
   the data is recorded in a unit of the physical cluster.

65. The optical disc as claimed in claim 16, wherein the run-in and the run-out further include a preamble and a post-amble, respectively, to perform a signal processing.

66. The method as claimed in claim 21, wherein the processing of the linkage includes setting the linkage subsequent to the defective area so as to resume the recording in an area subsequent to the defective area.

67. The method as claimed in claim 66, further comprising performing an error correction in response to the recording not resuming in an accurate starting point of the predetermined recording area subsequent to the defective area, after the end of recording before the defective area.

68. The method as claimed in claim 33, wherein the processing of the linkage includes setting the linkage subsequent to the defective area so as to resume the recording in an area subsequent to the defective area.

* * * * *

UNITED STATES PATENT AND TRADEMARK OFFICE
CERTIFICATE OF CORRECTION

PATENT NO. : 7,269,104 B2
APPLICATION NO. : 10/440242
DATED : September 11, 2007
INVENTOR(S) : Kyung-geun Lee, et al.

It is certified that error appears in the above-identified patent and that said Letters Patent is hereby corrected as shown below:

Column 7, line 54, change "clusters" to --cluster--.

Column 9, line 28, change "areas" to --area--.

Signed and Sealed this

Fourth Day of December, 2007

JON W. DUDAS
*Director of the United States Patent and Trademark Office*